United States Patent
Zhang et al.

(10) Patent No.: US 9,843,259 B2
(45) Date of Patent: *Dec. 12, 2017

(54) CIRCUITS AND METHODS PROVIDING THREE-LEVEL SIGNALS AT A SYNCHRONOUS BUCK CONVERTER

(71) Applicant: QUALCOMM Incorporated, San Diego, CA (US)

(72) Inventors: Chuang Zhang, San Diego, CA (US); James Thomas Doyle, Carlsbad, CA (US); Farsheed Mahmoudi, San Diego, CA (US); Amirali Shayan Arani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,267

(22) Filed: Aug. 26, 2016

(65) Prior Publication Data

US 2016/0380543 A1    Dec. 29, 2016

Related U.S. Application Data

(63) Continuation of application No. 14/630,318, filed on Feb. 24, 2015, now Pat. No. 9,450,491.

(Continued)

(51) Int. Cl.
*H02M 3/158* (2006.01)
*H02M 7/483* (2007.01)
(Continued)

(52) U.S. Cl.
CPC ............. *H02M 3/158* (2013.01); *H02M 1/14* (2013.01); *H02M 7/483* (2013.01); *H02M 2003/072* (2013.01)

(58) Field of Classification Search
CPC ...... H02M 3/156; H02M 3/158; H02M 3/1588
(Continued)

(56) References Cited

U.S. PATENT DOCUMENTS 5,574,392 A    11/1996    Jordan
7,453,250 B2   11/2008    Qiu et al.
(Continued)

FOREIGN PATENT DOCUMENTS

CN    101588126 A    11/2009
CN    101842971 A    9/2010
(Continued)

OTHER PUBLICATIONS

Burton E.A., et al., "FIVR—Fully Integrated Voltage Regulators on 4th Generation Intel® Core™ SoCs," IEEE 29th Annual Applied Power Electronics Conference and Exposition (APEC), Mar. 16-20, 2014, pp. 432-439.
(Continued)

*Primary Examiner* — Jeffrey Sterrett
(74) *Attorney, Agent, or Firm* — Haynes and Boone, LLP

(57) ABSTRACT

A circuit including: a three-level buck converter having: a plurality of input switches and an inductor configured to receive a voltage from the plurality of input switches, the plurality of input switches coupled with a first capacitor and configured to charge and discharge the first capacitor; a second capacitor at an output of the buck converter; and a switched capacitor at an input node of the inductor, wherein the switched capacitor is smaller than either the first capacitor or the second capacitor.

26 Claims, 5 Drawing Sheets

Related U.S. Application Data

(60) Provisional application No. 62/067,883, filed on Oct. 23, 2014.

(51) Int. Cl.
*H02M 1/14* (2006.01)
*H02M 3/07* (2006.01)

(58) Field of Classification Search
USPC .................................................. 323/271, 282
See application file for complete search history.

(56) References Cited

U.S. PATENT DOCUMENTS

| | | |
|---|---|---|
| 7,612,603 B1 | 11/2009 | Petricek et al. |
| 7,692,938 B2 | 4/2010 | Petter |
| 7,696,735 B2 | 4/2010 | Oraw et al. |
| 8,212,537 B2 | 7/2012 | Carpenter et al. |
| 8,400,132 B2 | 3/2013 | Zambetti et al. |
| 9,300,210 B1 | 3/2016 | Lidsky et al. |
| 2007/0296383 A1 | 12/2007 | Xu et al. |
| 2009/0174383 A1 | 7/2009 | Tsui et al. |
| 2011/0133704 A1 | 6/2011 | Zambetti et al. |
| 2012/0146608 A1 | 6/2012 | Wan et al. |
| 2013/0002227 A1 | 1/2013 | Ikeda et al. |
| 2013/0214754 A1 | 8/2013 | Chiang |
| 2014/0063884 A1 | 3/2014 | Itoh et al. |
| 2014/0111179 A1 | 4/2014 | Couleur et al. |
| 2014/0266135 A1 | 9/2014 | Zhak et al. |
| 2014/0268967 A1 | 9/2014 | White et al. |
| 2015/0009734 A1 | 1/2015 | Stahl et al. |
| 2015/0303815 A1 | 10/2015 | Chen et al. |
| 2016/0094123 A1 | 3/2016 | Chellappa |
| 2016/0118886 A1 | 4/2016 | Zhang et al. |
| 2016/0118887 A1 | 4/2016 | Zhang et al. |
| 2016/0190921 A1 | 6/2016 | Kumar et al. |

FOREIGN PATENT DOCUMENTS

| | | |
|---|---|---|
| CN | 101860206 A | 10/2010 |
| CN | 202940728 U | 5/2013 |
| CN | 102332818 B | 8/2013 |
| CN | 103490794 A | 1/2014 |
| CN | 103746557 A | 4/2014 |
| EP | 1826893 A1 | 8/2007 |
| EP | 2654205 A1 | 10/2013 |
| JP | H05219758 A | 8/1993 |
| JP | H10248243 A | 9/1998 |
| JP | 2013013220 A | 1/2013 |
| WO | WO-2012074967 A1 | 6/2012 |

OTHER PUBLICATIONS

International Search Report and Written Opinion—PCT/US2015/052035—ISA/EPO—dated Apr. 8, 2016.

Kim, W., et al., "A Fully-Integrated 3-Level DC-DC Converter for Nanosecond-Scale DVFS", IEEE Journal of Solid-State Circuits, vol. 47, No. 1, Jan. 2012, pp. 206-219.

Reusch D., "Three Level Buck Converter With Control and Soft Startup", IEEE Energy Conversion Congress and Exposition, Sep. 20, 2009, XP031887744, pp. 31-35. DOI: 10.1109/ECCE.2009.5316265, ISBN: 978-1-4244-2893-9.

Yousefzadeh V., et al., "Three-Level Buck Converter for Envelope Tracking in RF Power Amplifiers", IEEE Applied Power Electronics Conference and Exposition 2005 (APEC 2005), vol. 3, Mar. 6-10, 2005, pp. 1588-1594.

Chengyu L., "The Design of Double Close-Loop Control in Three-Level Buck Converter," Wan Fang Academic Dissertation, Sep. 18, 2014, 60 pages.

US 9,843,259 B2

CIRCUITS AND METHODS PROVIDING THREE-LEVEL SIGNALS AT A SYNCHRONOUS BUCK CONVERTER

CROSS-REFERENCE TO RELATED APPLICATIONS

This patent application is a continuation of U.S. application Ser. No. 14/630,318 filed on Feb. 24, 2015, which claims the benefit of U.S. Provisional Patent Application No. 62/067,883, filed Oct. 23, 2014, the contents of which are incorporated herein by reference.

TECHNICAL FIELD

This application relates to voltage converters and, more specifically, to three-level buck converters.

BACKGROUND

There are a wide variety of voltage converters available today, one type being the buck converter. Generally, a buck converter receives an input voltage and provides a stepped-down output voltage with a stepped-up output current. In other words, buck converters may typically be used in applications where it is desired to decrease a Direct Current (DC) voltage. Example applications include processing cores, where a buck converter is used to step down a DC voltage from a voltage rail so that the output voltage of the buck converter corresponds to an appropriate input voltage of the processing core.

An example conventional buck converter includes multiple switches at an input of the buck converter. The switches are turned on and off by a pulse width modulated input signal, where the duty cycle of the pulses determines an output voltage of the buck converter. As the switches turn on and off, they modulate a DC input voltage (sometimes referred to as VDD) and provide that modulated voltage to an inductor. The inductor is in communication with a capacitor, and the time-varying nature of the voltage at the input of the inductor causes the inductor to create a time-varying current. The interaction of the inductor and capacitor with the time-varying voltage and current produces a substantially constant output voltage, which is at a lower DC level than VDD.

One variety of buck converter is a three-level buck converter. Conventional three-level buck converters enjoy an effective doubling of their switching frequency. In one example, a conventional three-level buck converter has four input switches that each receive one of two pulse width modulated input signals. The timing of the two pulse width modulated input signals and the arrangement of the switches provides for an input voltage at the inductor that is at twice a frequency of the pulse width modulated input signals. In this conventional example, the input voltage at the inductor may vary between zero and VDD/2 or between VDD/2 and VDD, depending on the duty cycle of the pulse width modulated signals.

Three-level buck converters may be advantageous in some applications because an effective doubling of the switching frequency may allow for use of a smaller inductor. However, conventional three-level buck converters may sometimes experience ripple at the node between the switches and the inductor. Ripple may be undesirable in some applications because it may result in an unwanted variation of the output voltage of the buck converter. Thus, there is a need for improved three-level buck converters that reduce the ripple currents.

SUMMARY

Circuits and methods for providing stepped-down voltage are provided. In one example, a circuit and a method for a three-level buck converter has an effectively doubled switching rate and a low amount of ripple. One example circuit embodiment includes a small, switched capacitor in the buck converter at a node between the switches and the inductor. The additional capacitor helps to reduce ripple, especially in situations when the load is large.

An example method embodiment includes converting VDD to a stepped-down voltage with the buck converter having the switched capacitor at an input node of the inductor. In an embodiment having a three-level buck converter, the voltage at the input node of the capacitor is at twice a frequency of the pulse width modulated signals that control the switches. The additional, small capacitor is placed between the input node of the inductor and ground, so that it interacts with the 2× frequency signal, storing energy and discharging energy as the voltage varies. When ripple is present, the voltage may dip slightly low, and the capacitor may discharge enough energy to reduce or eliminate the ripple. Similarly, ripple may also cause the voltage to rise slightly high, and the capacitor may store enough energy in such a scenario to reduce or eliminate the ripple.

The load may change over time, and when the load is relatively light, the switch may be opened to disconnect the capacitor from the circuit. Similarly, when the load is relatively heavy, the switch may be closed to couple the capacitor to the circuit.

DETAILED DESCRIPTION

Example Circuit Embodiments

Figure 1:
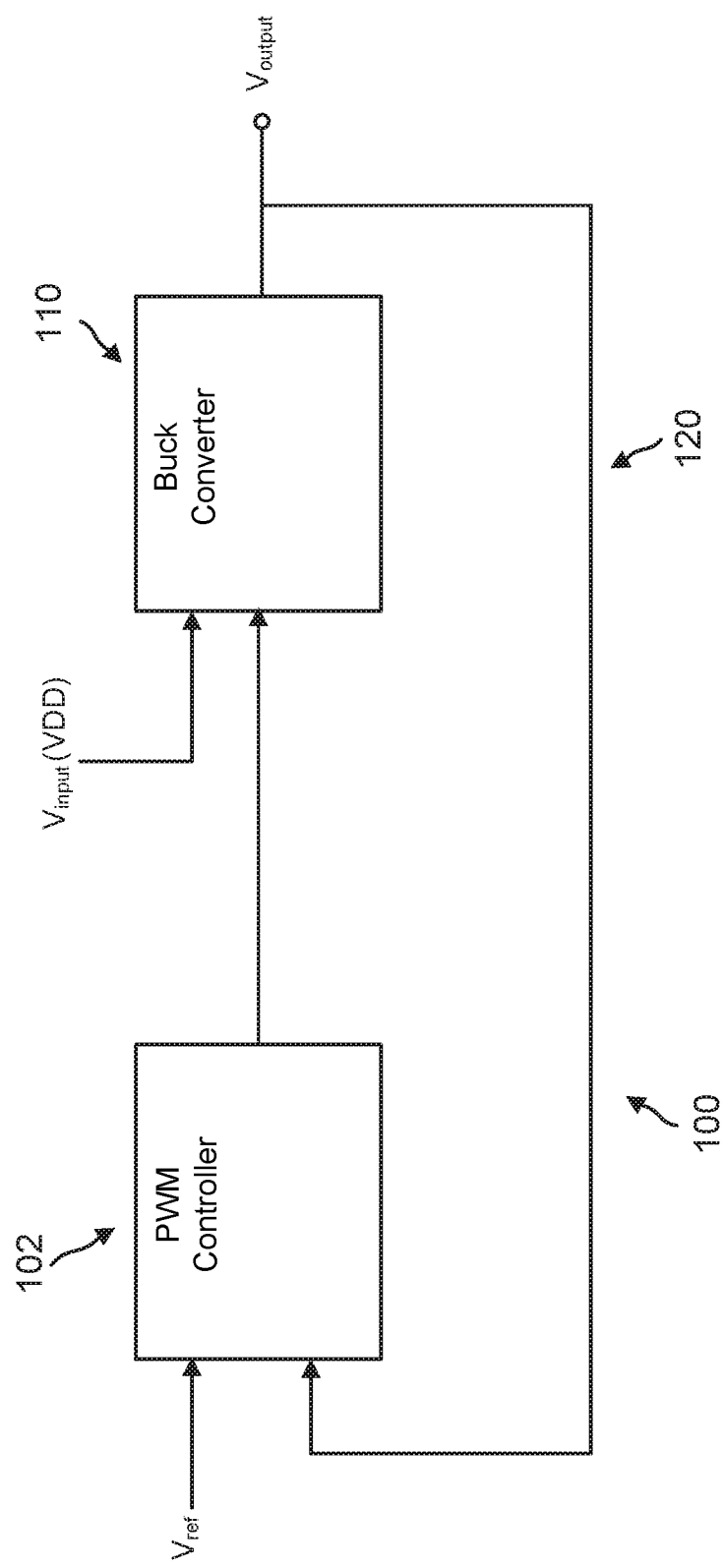
FIG. 1 illustrates an example feedback loop having a voltage converter, where the feedback loop maintains the output voltage at a relatively constant level, in accordance with an embodiment of the disclosure.

FIG. 1 is an architectural diagram illustrating an example feedback loop for providing a constant, or nearly constant, Voutput. Pulse Width Modulation (PWM) controller 102 receives a reference voltage (Vref) and a feedback signal 120 providing a value of Voutput and outputs a PWM signal in response to a difference between Vref and Voutput. The PWM controller 102 modulates the PWM signal by adjusting the duty cycle of the PWM signal. In general, a larger duty cycle of the PWM signal increases a voltage at the output of synchronous buck converter 110, and a smaller duty cycle of the PWM signal decreases a voltage at the output of synchronous buck converter 110. In this way, PWM controller 102 continually adjusts the duty cycle of the PWM signal to keep Voutput nearly constant. In this example embodiment, the PWM signal is actually two PWM signals, as shown in more detail in FIG. 3.

Buck converter 110 receives Vinput, which in some embodiments is a power signal from a power rail on a semiconductor die. In other embodiments, Vinput may include power from a battery or other voltage source. Switches in buck converter 110 open and close according to the control signals from PWM controller 102. The buck converter 110 provides a steady output voltage at Voutput. Synchronous buck converter 110 may include any synchronous buck converter now known or later developed that provides a three-level signal to the inductor. An example three-level signal may include, for instance, a signal that varies between zero and VDD/2 or between VDD/2 and VDD, depending on PWM timing and duty cycle.

Figure 2:
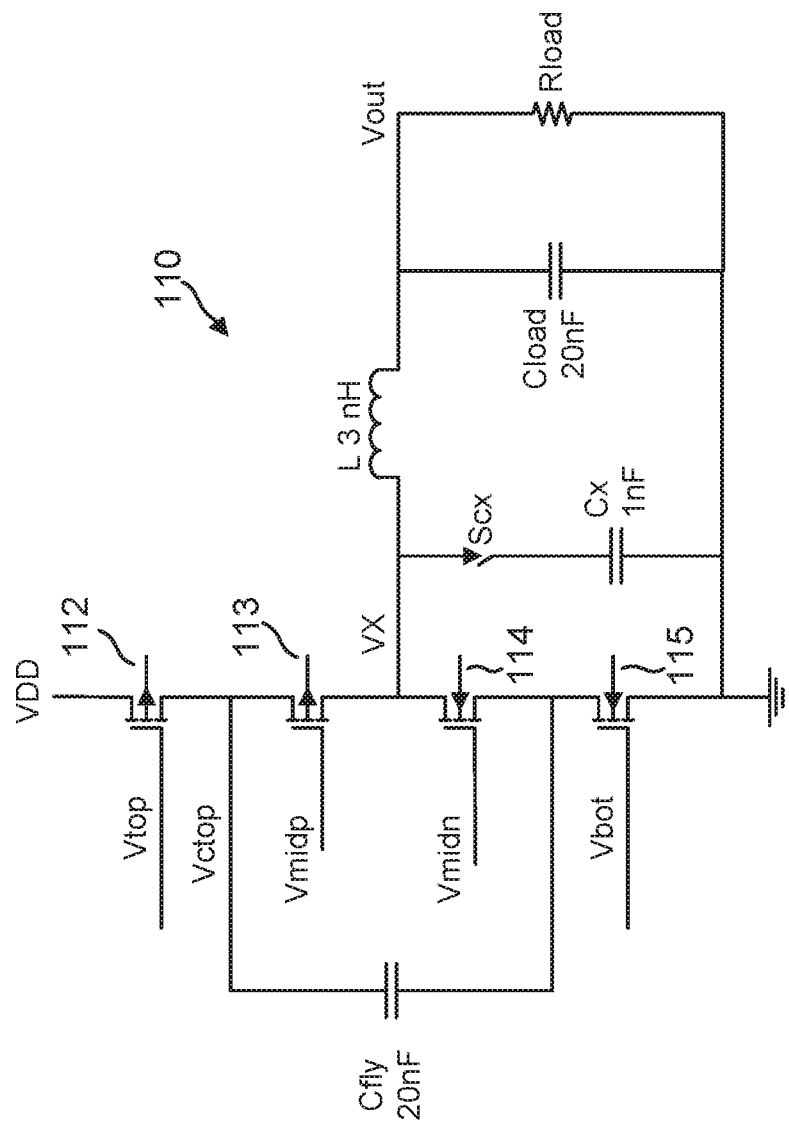
FIG. 2 illustrates an example three-level buck converter in accordance with an embodiment of the disclosure.

FIG. 2 is an illustration of an exemplary synchronous buck converter that can be used as buck converter 110 in the embodiment of FIG. 1. In FIG. 2, Vinput is shown as VDD, Voutput is shown Vout, and a resistive load Rload is shown between Vout and ground. In system on chip (SOC) embodiments, Rload may include, for example, a processing core, a modem, or the like. Thus, in one example, the converter 110 is part of a SOC and is configured to power a processing core. However, the scope of embodiments is not limited to SOCs.

FIG. 2 illustrates four switches, 112, 113, 114, 115 that are the input switches for buck converter 110. Flying capacitor (Cfly) is coupled between switches 112 and 113 and also between switches 114 and 115. In this example, the flying capacitor Cfly has a value of 20 nF, and the load capacitor (Cload) also has a value of 20 nF. In other words, the flying capacitor Cfly and the load capacitor Cload have a same value. At 1 nF, the switched capacitor (CX) is much smaller that both Cfly and Cload. Of course, the values provided in FIG. 2 are exemplary only, as other embodiments may use other values to achieve the same or similar results. In some embodiments, capacitors Cfly and Cload are larger than capacitor CX by at least an order of magnitude when measured in Farads. The principles discussed herein can be applied to a variety of different configurations of a three-level buck converter using any appropriate values for capacitors, inductors, resistors, switches, and the like.

In some embodiments, the flying capacitor Cfly may be manufactured as a metal-insulator-metal (MIM) capacitor to reduce parasitic to ground losses. However, the capacitor Cfly may be made according to any appropriate manufacturing process in various embodiments.

The input switches 112-115 provide a voltage (VX) at the input node of the inductor L, and voltage VX is a three-level voltage signal. As explained in more detail below, clock signals applied to the input switches 112-115 have half the frequency of the voltage changes of VX. In other words, the use of a three-level buck converter provides for a doubling of the frequency of the voltage at the buck converter's inductor. An advantage of a higher frequency at the voltage of the inductor L is that the value of the inductor L can be reduced. For instance, a doubling of the frequency of VX allows the size of the inductor L to be reduced to one quarter. Generally, a reduction in a value of an inductor allows for a physically smaller inductor, which can lead to lower costs and ease of manufacturing in some cases.

Switched capacitor CX is placed between the input node of the inductor L and ground to reduce ripple at that node. In operation, capacitor CX charges and discharges as the value of VX changes, and its charging and discharging has the effect of neutralizing ripple at the input node of the inductor L. It is counterintuitive to place capacitor CX in its illustrated position between inductor L and ground because capacitor CX would be expected to cause some loss in the circuit by conducting a small current to ground during some points in its operation. However, capacitor CX is appropriately sized very small compared to both the flying capacitor and the load capacitor (Cfly and Cload) so that any current that is conducted is very small. Also, the amount of energy stored by capacitor CX may be the same as or less than energy of the ripples at VX, so that the energy at capacitor CX may typically be used to neutralize ripple rather than conduct substantial current to ground.

In general, ripple is a phenomenon that is experienced with loads that are relatively heavy but is largely absent with loads that are relatively light. In some embodiments, capacitor CX is switched into the circuit by closing switch SCX when the load is relatively heavy. In those embodiments, the switch SCX may be opened when the load is relatively light, thereby removing capacitor CX from the circuit. In one example embodiment, the PWM controller (circuit 102 of FIG. 1) determines that the load is increasing by sensing a voltage droop and determines that the load is decreasing by sensing a voltage increase, and the PWM controller can turn switch SCX on or off as appropriate. In one example, switch SCX includes a transistor in communication with the switched capacitor CX, the transistor configured to open and close a conductive path between the input node of the inductor L and ground.

Figure 3:
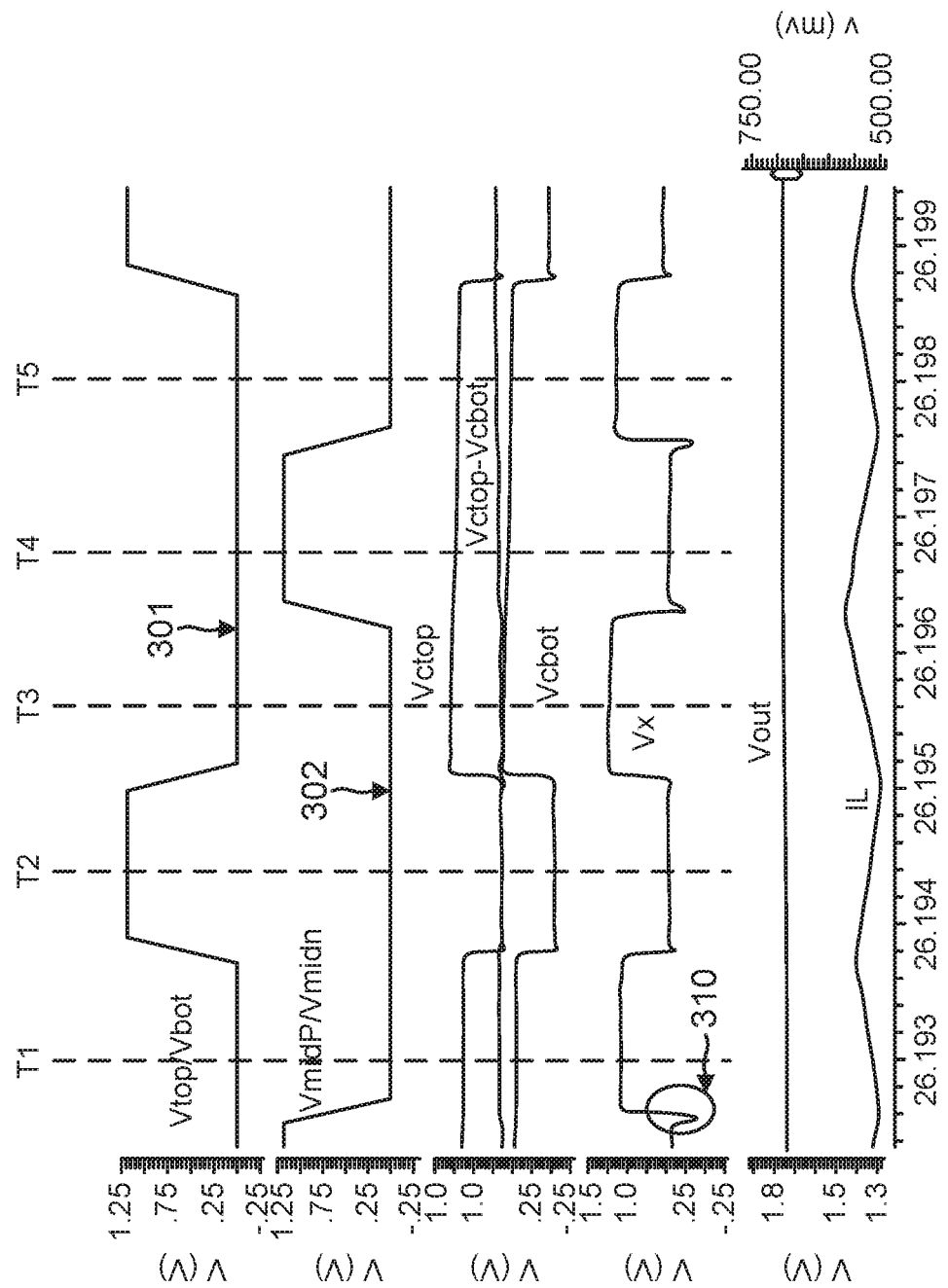
FIG. 3 illustrates an example timing diagram of the signals associated with the three-level buck converter of FIG. 2 in accordance with an embodiment of the disclosure.

FIG. 3 is an illustration of an example timing diagram, according to one embodiment. In this example, voltages 301 and 302 are PWM signals that are produced by circuit 102 of FIG. 1. Voltage 301 is provided to switch 112 and switch 115. Voltage 302 is provided to switches 113 and 114. VX and Vout are also labeled in FIG. 3. Of note in FIG. 3 is that voltage VX is at twice a frequency of voltages 301 and 302. In this example, voltages 301 and 302 are at 250 MHz, whereas the voltage VX is at a frequency of 500 MHz. However, the scope of embodiments is not limited to any particular frequency of input clock signals, as any appropriate frequency may be used in other embodiments.

As noted above, three level buck converter 110 is operable to provide voltage VX as a three-level voltage that can vary either between zero and VDD/2 or between VDD/2 and VDD. In the example of FIG. 3 voltage VX varies between VDD/2 and VDD as a result of the duty cycle of signals 301 and 302. However, it is understood that voltage VX would vary between zero and VDD/2 if the duty cycle of signals 301 and 302 was reduced.

Further, various embodiments provide for an elimination or reduction of ripple at the voltage VX. Example ripple 310 is illustrated in FIG. 3 around time T1, and similar ripple occurs at voltage VX at other times as well. As noted above, the use of switched capacitor CX may reduce or eliminate ripple, and in this embodiment the amount of ripple is not non-zero, but is reduced from what it would be otherwise in the absence of capacitor CX in the circuit of FIG. 2.

FIG. 3 further has time markings to indicate times T1-T5 for ease of explanation. At time T1 switch 112 is ON, switch 113 is ON, switch 114 is OFF, and switch 115 is OFF. Since switches 112 and 113 are ON, VX is brought to VDD, and Cfly is charged.

At time T2 switch 112 is OFF, switch 113 is ON, switch 114 is OFF, and switch 115 is ON. Thus, capacitor Cfly is coupled across the input node to inductor L and ground through switch 115. The voltage VX is accordingly decreased.

At time T3, switch 112 is ON, switch 113 is ON, switch 114 is OFF, and switch 115 is OFF. Capacitor Cfly is charged again, similar to that described above with respect to time T1. Voltage VX is increased.

Figure 4:
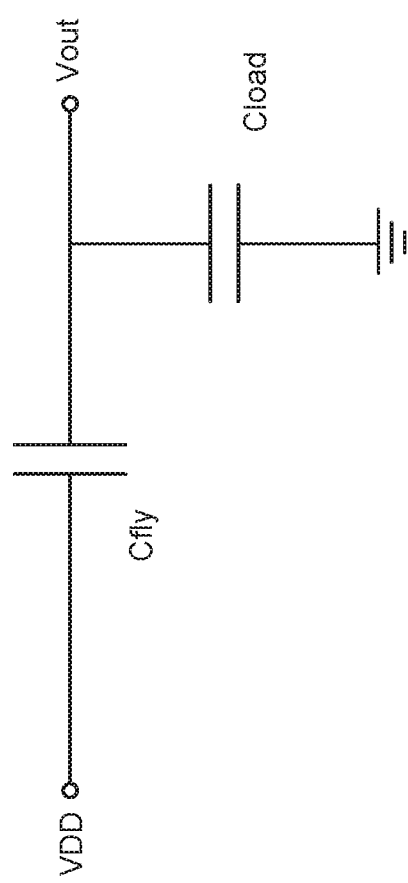
FIG. 4 illustrates an example voltage divider scenario during operation of the three-level buck converter of FIG. 2, according to an embodiment of the disclosure.

At time T4, switch 112 is ON, switch 113 is OFF, switch 114 is ON, and switch 115 is OFF. Thus, capacitor Cfly is coupled between VDD through switch 112 and VX through switch 114. Capacitors Cfly and Cload acts as a voltage divider at time T4, as illustrated in FIG. 4.

At time T5, switch 112 is ON, switch 113 is ON, switch 114 is OFF, and switch 115 is OFF. Capacitor Cfly is charged again by virtue of VDD. The progression of times from T1 through T5 shows how switches 112-115 are operated to charge and discharge capacitor Cfly and to provide the voltage VX at the input node of inductor L.

Of course, the timing diagram of FIG. 3 represents a snapshot of time, and it is understood that in a real-world example a three-level buck converter may operate for an extended period of time including thousands or millions of cycles of signals 301 and 302. Referring back to the feedback loop of FIG. 1, the PWM controller 102 compares Vout to Vref and adjusts the duty cycle of signals 301 and 302 to keep the level of Vout substantially constant. While the timing diagram of FIG. 3 does not show the duty cycle of signals 301 and 302 being adjusted, it is understood that the feedback loop provide such functionality.

Example Method Embodiments

Figure 5:
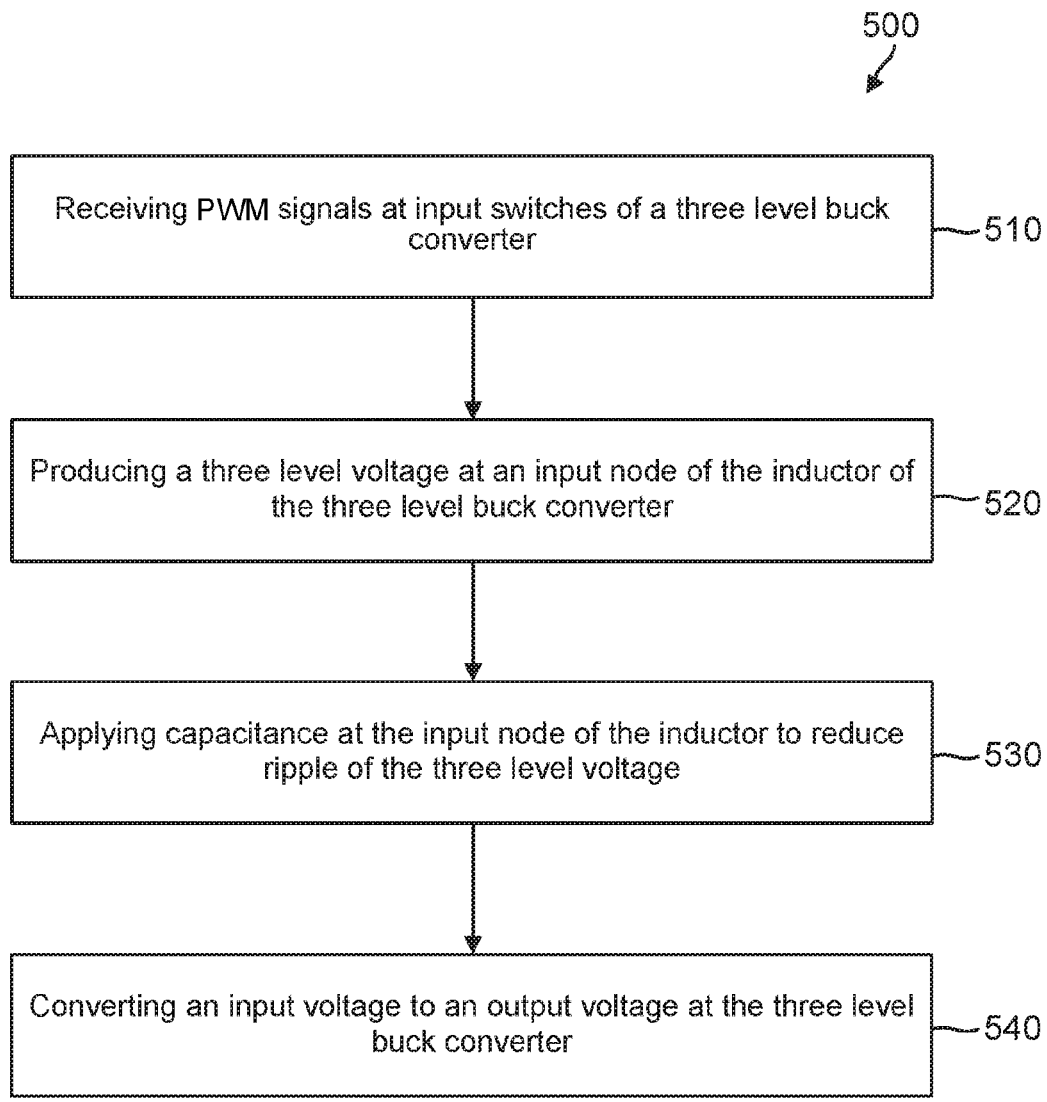
FIG. 5 illustrates a flowchart of an example method of use for the system of FIGS. 1-4 to achieve a output voltage in accordance with an embodiment of the disclosure.

A flow diagram of an example method 500 of operating a three-level buck converter is illustrated in FIG. 5. In one example, method 500 is performed by a three-level buck converter, such as buck converter 110 of FIG. 2, to convert an input voltage (for example VDD) to an output voltage Vout with minimal ripple at an input node of the inductor of the buck converter. Method 500 is performed in a system, such as system 100 of FIG. 1, which includes a feedback loop and a synchronous buck converter held at a nearly constant voltage. The buck converter is controlled by a PWM signal, where adjustments in the duty cycle of the PWM signal cause the buck converter to either lower or raise the output voltage.

At action 510, the buck converter receives PWM signals at its input switches. An example is shown in the timing diagram of FIG. 3 where voltages 301 and 302 are PWM signals that affect the output voltage of the buck converter. Examples of input switches include the transistors identified as switches 112-115 in FIG. 2.

At action 520, the input switches and a flying capacitor of the buck converter produce a three-level voltage at an input node of the inductor of the converter. An example of the three-level voltage at the input node includes voltage VX of FIGS. 2 and 3. The voltage VX shown in FIG. 3 varies between VDD/2 and VDD, but a reduction in the duty cycle of the PWM signals may cause the voltage VX to vary between zero and VDD over two. As shown in FIG. 3, voltage VX has a frequency twice that of the signals 301 and 302.

At action 530, capacitance is applied at the input node of the inductor to reduce ripple of the three-level voltage. An example is capacitor CX in FIG. 2. In some embodiments, capacitor CX may be accompanied by a switch so that it can be added to or removed from the circuit. Action 530 may include in some embodiments turning the switch on to include capacitor CX when the load is relatively heavy and turning the switch off to remove capacitor CX when the load is relatively light. Logic to switch on and switch off capacitor CX may be included in any appropriate part of the circuit, including in the PWM controller or other circuit.

At action 540, the buck converter converts the input voltage to the output voltage. An example output voltage is shown as Vout in FIG. 3.

The scope of embodiments is not limited to the specific method shown in FIG. 5. Other embodiments may add, omit, rearrange, or modify one or more actions. For instance, action 540 is performed continually as actions 510-530 are also performed. For instance, method 500 may be part of a larger feedback operation that holds the output voltage of the buck converter at the nearly constant value (the larger feedback operation is described in more detail above with respect to FIG. 1).

Various embodiments may include advantages. For instance, by adding a charge sharing cap CX and switch SCX the $3^{rd}$ level voltage (across Cfly) VDD/2 is more stable across power, voltage, and temperature (PVT). Without the CX, the $3^{rd}$ level voltage may not be as stable at VDD/2 over PVT unless a complicated VDD/2 regulator (not shown) is used. Such increased stability may result in less ripple at the voltage VX.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
   a converter with a plurality of levels, the converter having:
      a plurality of input switches, the plurality of input switches coupled with a first capacitor and configured to charge and discharge the first capacitor;
      an inductor configured to receive a voltage from the first capacitor and the plurality of input switches;
      a second capacitor at an output node of the converter; and
      a switched capacitor at an input node of the inductor, wherein the capacitance of the switched capacitor is smaller than the capacitance of either the first capacitor or the second capacitor.

2. The circuit of claim 1, wherein the first capacitor has a substantially same capacitance as the second capacitor.

3. The circuit of claim 1, wherein the capacitance of the first and second capacitors is greater than the capacitance of the switched capacitor by at least an order of magnitude as measured in Farads.

4. The circuit of claim 1, wherein the switched capacitor is disposed between the input node of the inductor and ground.

5. The circuit of claim 1, further comprising a pulse width modulation controller configured to receive an output voltage of the converter and to vary a duty cycle of control signals to the input switches in response to receiving the output voltage.

6. The circuit of claim 1, further comprising:
a switch in communication with the switched capacitor, the switch configured to open and close a conductive path between the input node of the inductor and ground; and
a pulse width modulation controller configured to provide control signals to the plurality of input switches and configured to control the switch in communication with the switched capacitor.

7. The circuit of claim 1, wherein the plurality of input switches are coupled to VDD and ground, further wherein the voltage from the plurality of input switches varies between either zero and VDD/2 or VDD/2 and VDD.

8. A converter comprising:
means for receiving first and second pulse width modulated signals and charging and discharging a first capacitor between a voltage rail and ground in response to the first and second pulse width modulated signals;
means for generating an output voltage of the converter in response to receiving a first voltage produced by the charging and discharging of the pulse width modulated signals; and
a second capacitor disposed at a node between the means for receiving and the means for generating.

9. The converter of claim 8, wherein the second capacitor has a capacitance at least one order of magnitude smaller than a capacitance of the first capacitor and at least one order of magnitude smaller than a capacitance of a third capacitor in the means for generating.

10. The converter of claim 8, further comprising:
means for opening and closing a conductive path between the means for generating and ground, the conductive path including the second capacitor.

11. A method comprising:
receiving a plurality of pulse width modulated control signals at input switches of a converter having a plurality of levels, the input switches being coupled with a first capacitor and configured to charge and discharge the first capacitor in response to the plurality of pulse width modulated control signals;
producing a voltage at an input node of an inductor of the converter, the voltage at the input node of the inductor being controlled by the pulse width modulated control signals, the converter further including a second capacitor at an output node of the inductor;
producing an output voltage at an output node of the converter in response to the voltage at the input node of the inductor; and
charging and discharging a switched capacitor at the input node of the inductor.

12. The method of claim 11, further comprising:
closing a switch at the switched capacitor in response to a load.

13. The method of claim 11, wherein the first capacitor and the second capacitor have a substantially similar capacitance.

14. The method of claim 11, wherein a capacitance of the first and second capacitor is larger than a capacitance of the switched capacitor by at least an order of magnitude.

15. The method of claim 11, wherein discharging the switched capacitor comprises discharging less energy than in a ripple at the voltage at the input node of the inductor.

16. The method of claim 11, wherein the charging and discharging the switched capacitor comprises reducing a ripple in the voltage at the input node of the inductor.

17. The method of claim 11, wherein the converter includes four input switches, wherein a first set of two of the input switches receives a first one of the pulse width modulated control signals, and wherein a second set of two of the input switches receives a second one of the pulse width modulated control signals, wherein the first and second pulse width modulated control signals are phase shifted by 180°.

18. The method of claim 11, further comprising:
opening a switch at the switched capacitor in response to a load.

19. A circuit comprising:
a voltage converter with a plurality of levels, the voltage converter having:
a set of input transistors configured to be controlled by first and second pulse width modulated signals and also configured to charge and discharge a first capacitor that is in communication with the set of input transistors;
an inductor coupled with the set of input transistors and configured to receive a voltage produced by the charging and discharging of the first capacitor;
a second capacitor at an output node of the voltage converter and in communication with the inductor; and
a third capacitor disposed at an input node of the inductor, the third capacitor having a capacitance value at least an order of magnitude smaller than capacitance values of both the first capacitor and the second capacitor.

20. The circuit of claim 19, further comprising:
a pulse width modulation controller in communication with the voltage converter and configured to provide the first and second pulse width modulated signals in response to a reference signal and a feedback signal from the output node of the voltage converter.

21. The circuit of claim 19, wherein the first and second capacitors have a substantially same capacitance value as measured in Farads.

22. The circuit of claim 19, wherein the set of input transistors comprises four transistors disposed between VDD and ground.

23. The circuit of claim 19, wherein the set of input transistors comprises four transistors disposed between VDD and ground, further wherein the first capacitor is coupled to ground when a first one of the transistors is on and is coupled to VDD when a second one of the transistors is on.

24. The circuit of claim 19, wherein the set of input transistors comprises two p-type transistors and two n-type transistors disposed between VDD and ground.

25. The circuit of claim 19, wherein the set of input transistors comprises two p-type transistors and two n-type transistors disposed between VDD and ground, further wherein the first capacitor is coupled to a node between a first n-type transistor and a second n-type transistor and coupled to another node between a first p-type transistor and a second p-type transistor.

26. The circuit of claim 19, further comprising:
a feedback loop including a pulse width modulation controller configured to provide the first and second pulse width modulated signals to maintain an output voltage of the voltage converter at a desired level.

* * * * *